(12) United States Patent
Brouwer, II et al.

(10) Patent No.: US 11,061,985 B2
(45) Date of Patent: **\*Jul. 13, 2021**

(54) SYSTEM AND METHOD FOR LINKING DATA RECORDS FOR PARCELS

(71) Applicant: CoreLogic Solutions, LLC, Irvine, CA (US)

(72) Inventors: Derek J. Brouwer, II, Irvine, CA (US); Peter A. Nagy, Irvine, CA (US)

(73) Assignee: CoreLogic Solutions, LLC, Irvine, CA (US)

( \* ) Notice: Subject to any disclaimer, the term of this patent is extended or adjusted under 35 U.S.C. 154(b) by 140 days.

This patent is subject to a terminal disclaimer.

(21) Appl. No.: 16/370,686

(22) Filed: Mar. 29, 2019

(65) Prior Publication Data

US 2019/0294647 A1    Sep. 26, 2019

Related U.S. Application Data

(63) Continuation of application No. 14/713,663, filed on May 15, 2015, now Pat. No. 10,248,731.

(60) Provisional application No. 61/994,363, filed on May 16, 2014.

(51) Int. Cl.
*G06Q 50/16* (2012.01)
*G06F 16/9537* (2019.01)
*G06F 16/29* (2019.01)

(52) U.S. Cl.
CPC .......... *G06F 16/9537* (2019.01); *G06F 16/29* (2019.01); *G06Q 50/16* (2013.01)

(58) Field of Classification Search
CPC ...... G06F 16/9537; G06F 16/29; G06Q 50/16

USPC ......................................................... 707/769
See application file for complete search history.

(56) References Cited

U.S. PATENT DOCUMENTS

| | | | |
|---|---|---|---|
| 6,038,559 A | 3/2000 | Ashby et al. | |
| 6,308,177 B1 | 10/2001 | Israni et al. | |
| 6,336,111 B1* | 1/2002 | Ashby | G01C 21/32 |
| | | | 707/715 |
| 7,114,050 B2 | 9/2006 | Ashby | |
| 7,197,500 B1 | 3/2007 | Israni et al. | |
| 7,324,666 B2 | 1/2008 | Zoken et al. | |
| 7,822,691 B1 | 10/2010 | Kuo | |
| 7,890,509 B1* | 2/2011 | Pearcy | G06Q 10/10 |
| | | | 707/736 |
| 8,078,594 B1* | 12/2011 | Pearcy | G06F 16/113 |
| | | | 707/692 |
| 8,468,167 B2 | 6/2013 | Sathyanarayana et al. | |

(Continued)

OTHER PUBLICATIONS

Corelogic, Inc., "PxPoint Geocoder," Dec. 2014, in 2 pages.

(Continued)

*Primary Examiner* — Hanh B Thai
(74) *Attorney, Agent, or Firm* — Knobbe Martens Olson & Bear LLP

(57) ABSTRACT

Computerized data management systems and methods for inter-relating, indexing, and organizing data records stored in a database or as computer files are described. The systems and methods can be used for linking or associating data records relating to real estate parcels. A given parcel in a community of parcels may have many neighbors. The systems and methods can identify a reduced set of neighbors of the parcel that have addresses that bracket the address of the parcel.

29 Claims, 6 Drawing Sheets

(56) References Cited

U.S. PATENT DOCUMENTS

| | | | |
|---|---|---|---|
| 8,538,918 B1* | 9/2013 | Pearcy | G06Q 10/10 |
| | | | 707/609 |
| 9,070,176 B2* | 6/2015 | Pearcy | G06Q 50/165 |
| 9,105,070 B2* | 8/2015 | Pearcy | G06Q 10/06 |
| 9,639,757 B2 | 5/2017 | Du et al. | |
| 2003/0140064 A1* | 7/2003 | Klein | G06Q 10/08 |
| 2004/0138817 A1 | 7/2004 | Zoken et al. | |
| 2006/0265350 A1* | 11/2006 | Klein | G06F 3/04842 |
| 2007/0078665 A1 | 4/2007 | Dodson et al. | |
| 2007/0124328 A1* | 5/2007 | Klein | G06F 3/04842 |
| 2009/0018975 A1 | 1/2009 | Geltner et al. | |
| 2009/0171980 A1 | 7/2009 | Meadow et al. | |
| 2009/0177557 A1* | 7/2009 | Klein | G06F 16/29 |
| | | | 705/26.1 |
| 2009/0198681 A1 | 8/2009 | Burnstein et al. | |
| 2009/0327157 A1 | 12/2009 | Dunne | |
| 2011/0173227 A1* | 7/2011 | Klein | G06F 16/972 |
| | | | 707/769 |
| 2012/0066187 A1* | 3/2012 | Pearcy | G06Q 10/06 |
| | | | 707/692 |
| 2012/0078956 A1* | 3/2012 | Klein | G06F 16/972 |
| | | | 707/769 |
| 2012/0197685 A1 | 8/2012 | Mays et al. | |
| 2013/0182108 A1 | 7/2013 | Meadow et al. | |
| 2013/0191292 A1* | 7/2013 | Meadow | G06T 11/60 |
| | | | 705/306 |
| 2013/0262153 A1 | 10/2013 | Collins et al. | |
| 2014/0074791 A1* | 3/2014 | Pearcy | G06Q 50/16 |
| | | | 707/661 |
| 2014/0188740 A1* | 7/2014 | Pearcy | G06Q 50/16 |
| | | | 705/315 |
| 2014/0237410 A1* | 8/2014 | Klein | G06Q 10/08 |
| | | | 715/771 |
| 2015/0088886 A1 | 3/2015 | Brouwer, II et al. | |
| 2015/0332419 A9* | 11/2015 | Budlong | G06Q 50/165 |
| | | | 705/315 |
| 2016/0330592 A1* | 11/2016 | Crook | H04W 4/021 |

OTHER PUBLICATIONS

Corelogic, Inc., "ParcelPoint Parcel Data Sheet," Mar. 2015, in 2 pages.

Pace et al., "A method for spatial-temporal forecasting with an application to real estate prices." Apr. 2000, International Journal of Forecasting, vol. 16, Issue 2, pp. 229-246.

* cited by examiner

SYSTEM AND METHOD FOR LINKING DATA RECORDS FOR PARCELS

CROSS-REFERENCE TO RELATED APPLICATIONS

This application is a continuation of U.S. patent application Ser. No. 14/713,663, titled "SYSTEM AND METHOD FOR LINKING DATA RECORDS FOR PARCELS," filed May 15, 2015, issued as U.S. Pat. No. 10,248,731, which claims the benefit of priority to U.S. Provisional Patent Application No. 61/994,363, filed May 16, 2014, titled "SYSTEM AND METHOD FOR LINKING PARCELS," which are hereby incorporated by reference herein in their entireties.

TECHNICAL FIELD

The present disclosure generally relates to computerized data management systems for inter-relating, indexing, and organizing data records stored in a database or as computer files, and more particularly to linking or associating data records relating to real estate parcels.

BACKGROUND

Entities such as real estate brokers, mortgage lenders, banks, insurance companies, utilities, and so forth may wish to obtain information about one or more real estate parcels in a neighborhood. For example, a real estate broker or property appraiser may want to provide a valuation for a specific real estate parcel and may wish to obtain information about other real estate parcels in the neighborhood of the specific real estate parcel (e.g., comparables) as part of the valuation process. Such entities may access a computerized database of real estate parcels to obtain information about the parcels.

SUMMARY

An implementation of a method of linking real estate parcels in a database is described. The method is performed under control of a geocoding engine comprising computer hardware. The method includes accessing a data repository that is configured to store parcel data for each of a plurality of real estate parcels. The parcel data is associated with each real estate parcel comprising an address number and a parcel boundary. The method also includes identifying a community of real estate parcels, with the community comprising a plurality of real estate parcels separated by no more than a threshold distance, with at least some of the plurality of real estate parcels having spatially contiguous boundaries. The method further includes calculating a community border for the community of real estate parcels by: determining links among the real estate parcels in the community to identify a set of neighboring parcels for each of the real estate parcels in the community, generating enlarged parcels by enlarging the parcel boundaries of the real estate parcels in the community to create an overlap among the neighboring parcels among the real estate parcels in the community, finding a union of the enlarged parcels to identify an outward facing boundary of the union of enlarged parcels, and reducing the outward facing boundary of the union of enlarged parcels to determine the community border for the community. The method includes identifying a group of real estate parcels in the community, wherein each of the real estate parcels in the group intersects the community border, determining, for each real estate parcel in the group, a border intersection between the real estate parcel and the community border, finding, for each real estate parcel in the group, a reduced set of neighboring real estate parcels based at least in part on a distance between the border intersection for the real estate parcel and locations of the other real estate parcels in the group, and linking, for each real estate parcel in the group, the real estate parcel to at least one other real estate parcel in the reduced set, such that the at least one other real estate parcel in the reduced set has an address number that brackets an address number of the real estate parcel.

An implementation of a system for of linking in a database is described. The system comprises non-transitory data storage configured to store parcel data for each of a plurality of parcels, with the parcel data associated with each parcel comprising an address number and a parcel boundary, and a computer system comprising computer hardware. The computer system is in communication with the non-transitory data storage, and the computer system programmed with executable instructions to perform the following: identify a community of parcels, with the community comprising a plurality of parcels separated by no more than a threshold distance, and at least some of the plurality of parcels having spatially contiguous boundaries. The computer system is also programmed to calculate a community border for the community of parcels by: determining neighboring parcels for each of the parcels in the community, generating enlarged parcels so that at least some neighboring parcels overlap, finding an outer perimeter of a union of the enlarged parcels, and reducing the outer perimeter of the union of enlarged parcels to provide the community border for the community. The computer system is also programmed such that for each parcel in the community of parcels that intersects the community border, the system can calculate a border intersection between the parcel and the community border, determine a reduced set of neighboring parcels based at least in part on distances between the border intersection for the parcel and locations of other parcels that intersect the community border, and link the parcel to at least one other parcel in the reduced set of neighboring parcels, such that the at least one other parcel in the reduced set has an address number that brackets an address number of the parcel.

An implementation of non-transitory computer storage is described. The non-transitory computer storage comprises computer-executable instructions that, when executed by a computer, cause the computer to identify a community of parcels, with the community comprising a plurality of parcels separated by no more than a threshold distance, and at least some of the plurality of parcels having spatially contiguous boundaries. The computer-executable instructions also include instructions to calculate a community border for the community of parcels, and for each parcel in the community of parcels that intersects the community border, calculate a border intersection between the parcel and the community border, determine a reduced set of neighboring parcels based at least in part on distances between the border intersection for the parcel and locations of other parcels that intersect the community border, and link the parcel to at least one other parcel in the reduced set of neighboring parcels.

Details of one or more implementations of the subject matter described in this specification are set forth in the accompanying drawings and the description below. Other features, aspects, and advantages will become apparent from the description, the drawings, and the claims. Neither this

Throughout the drawings, reference numbers may be re-used to indicate correspondence between referenced elements. The drawings are provided to illustrate example embodiments described herein and are not intended to limit the scope of the disclosure.

DETAILED DESCRIPTION

Overview

In the process of building a real estate parcel dataset, some parcel addresses may be missing because the information either did not exist in the original data obtained from counties, or the records failed to pass a validation process due to bad values such as invalid street numbers or names. In some cases, a validation process may use addresses from other databases to fill in parcels data records with missing or bad information. For the validation process to associate an address with the correct parcel, in some embodiments, the parcels can be linked to neighboring parcels based on potential street number order.

Linking a particular parcel to 'address neighbors' with the next lower and next higher address number in a spatial sense can present challenges. A parcel may have many spatial neighbors either touching or nearly the parcel, and only some of these neighbor parcels may bracket the parcel in a street number sense. Many situations exist where more than one set of bracketing neighbor parcels exist. Accordingly, it is desirable to provide a link process to maintain potential links between potential address neighbors, while dismissing or removing links between the remaining spatial neighbor parcels. The example geocoding engines and address linking methods described herein can be used to address such challenges.

For example, in some cases, an address number may not be known for one or more parcels in a group of parcels (e.g., a community of parcels described below), e.g., due to errors or omissions in an address data source. Certain implementations of the disclosed systems and methods can be used to identify address neighbors of the parcels with unknown address numbers. By using the (known) address numbers of at least some of the neighbor parcels, the systems and methods can assign a likely address number to parcels with unknown address numbers. Further, even if address numbers for all the parcels in the community are known from a particular data source, implementations of the systems and methods can be used to validate or verify the address numbers from the data source.

Example System for Linking Real Estate Parcels

Figure 1:
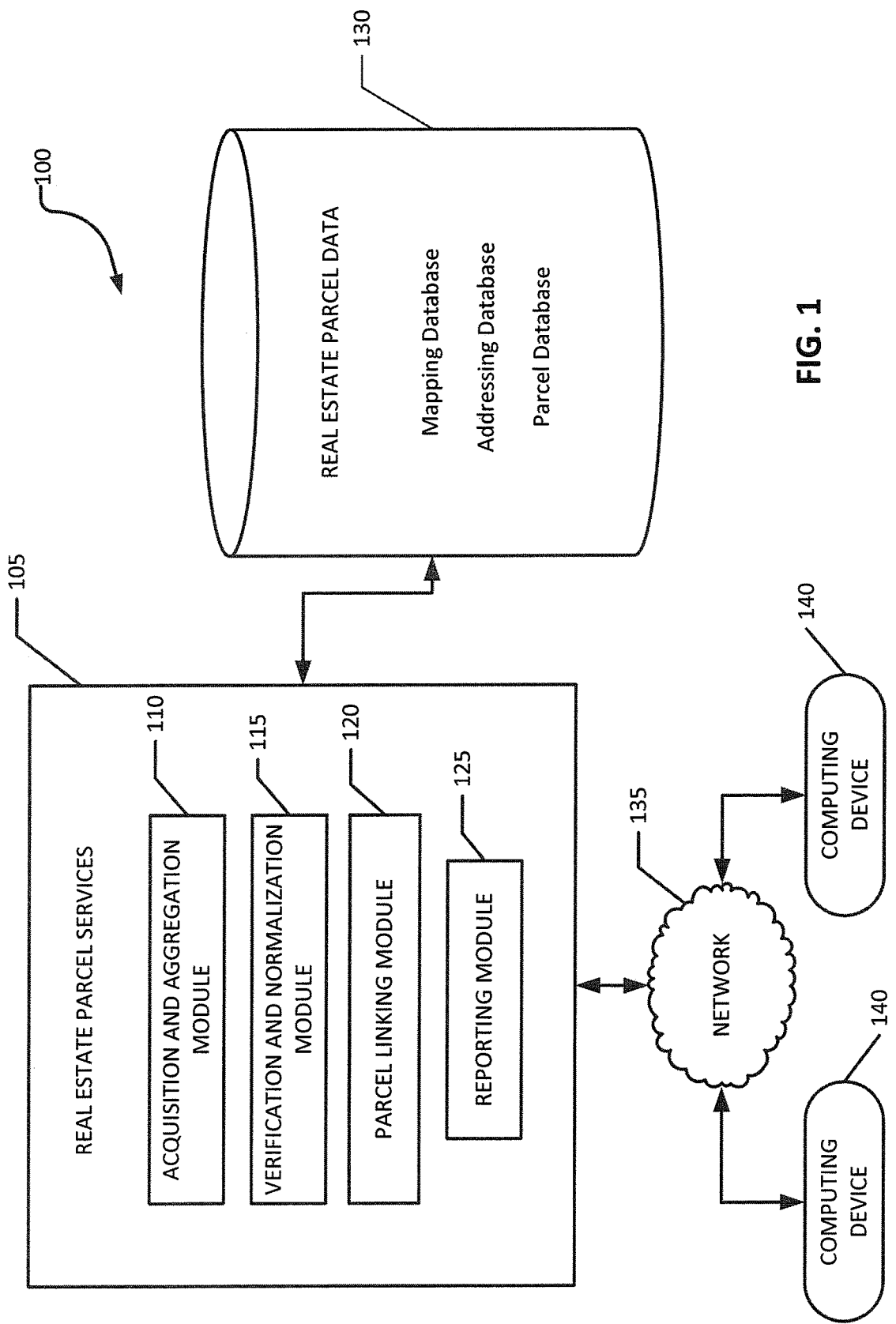
FIG. 1 is a block diagram schematically illustrating an example of a geocoding engine for managing information associated with real estate parcels.

FIG. 1 is a block diagram schematically illustrating an example of a geocoding engine 100 for managing information associated with real estate parcels. The geocoding engine 100 can provide services for inter-relating, indexing, and organizing data records stored in a database or as computer files, and more particularly to linking or associating data records relating to real estate parcels.

The example geocoding engine 100 can provide precise address standardization and can use multiple data sources to convert physical address or locations into precise geographic coordinates. The geocoding engine 100 can integrate information relating to street geometry, street-segment attribution, postal delivery locations, and individual property parcels. For example, in various embodiments, the geocoding engine 100 can provide services to identify points inside or near a parcel, establish distance(s) to coastlines, rivers, or other natural hazard areas, spatially compute map feature types (e.g., points, lines, polygons), provide post code centroids, city centroids, and intersections, or provide parcel ownership information.

The geocoding engine 100 illustrated in FIG. 1 includes a set of real estate parcel services 105 that are accessible over a network 135 via one or more computing devices 140. The parcel services 105 can access a data repository 130 (e.g., via the network 135) to perform various types of parcel data management tasks, including tasks associated with parcel acquisition and aggregation 110, verification 115, parcel linking 120, and reporting 125. The modules 110, 115, 120, and 125 can be implemented as software or machine-readable instructions that are stored in a memory. In the illustrated embodiment, the data repository 130 includes a database of mapping data, a database of addressing data, and a database of parcel data. Although depicted as separate databases, some of these data collections may be merged into a single database or distributed across multiple distinct databases. Further, additional databases containing other types of information may be maintained and used by the parcel services 105.

The mapping database can include Geographic Information Systems ("GIS") data associated with real estate parcels. The mapping database can include boundary and centroid data for the parcels. Boundary data for a parcel may include boundary coordinates and, in some cases, the parcel geometry may be defined as polygon data (e.g., coordinates of polygon corners, vertices, nodes, or edges). Coordinates may include latitude and/or longitude coordinates or other coordinate types. The mapping database can include shape files for the parcels, which may include designators to indicate where coordinates begin and end for a parcel geometry (e.g., the coordinates for a geometry may be placed on the same line or may be surrounded on either side by a geometry indicator (such as an asterisk or backslash).

Mapping data can be obtained from one or more mapping services providers such as Google, Apple, HERE, TomTom, etc.

The addressing database contains addressing data obtained from one or more entities, such as government agencies (e.g., cities, counties, etc.), the U.S. Postal Service, etc. that include mailing address data associated with real estate parcels. Addressing data for a parcel can include an address number, a street name, a directional (e.g., direction information such as N, S, E, W, NE, NW, SE, SW), which may be predirectional (before the street name) or postdirectional (after the street name), city name, state, zip code, and/or country.

The parcel database can include information acquired or aggregated for real estate parcels. For example, parcel data can be obtained from multiple entities such as a county recorder's office, a tax assessor's office, private entities (e.g., CoreLogic, Inc., Irvine, Calif.), etc. Parcel data can include attributes of real estate parcels such as, e.g., address, assessor parcel number (APN), tax identification number, as well as information on the owner (or occupier) of the parcel.

As one example, the real estate parcel data stored in the data repository 130 can include data records on parcels in several thousand counties in the U.S., accounting for 140 million parcels nationwide. Accordingly, highly specialized computer techniques are necessary to index, organize, and link these hundreds of millions of data records in the databases.

The real estate parcel services 105 can include modules for parcel acquisition and aggregation 110, parcel verification 115, parcel linking 120, and reporting 125. For convenience herein, the data management operations may be said to be performed on parcels, and this is to be understood as meaning the data management operations are performed on a parcel data (e.g., parcel data records stored in a parcel database) rather than on the physical real estate parcels referenced by the parcel data.

The parcel acquisition and aggregation module 110 can acquire parcel data from one or more sources (governmental or commercial) and store the aggregated parcel information in the parcel database in the data repository 130. Scripts may be used to perform data standardization and/or normalization of parcel data from different sources into a common format database or collection of databases. For example, data may be collected from sources (e.g., external) and scripts may be used to convert the data, clean-up/repair data, and track data during the acquisition process. Scripts may perform these functions in an automated manner or may execute with manual assistance from a system user (e.g., through a graphical user interface).

The verification module 115 can verify the accuracy of the acquired parcel data by comparing to the mapping date and/or the address data. Data verification may be performed before the aggregated parcel data is stored in the parcel database. Various algorithms may be performed for the verification. For example, weights and/or priorities may be applied to the mapping data and addressing data. In some regions the mapping data may be known to be more accurate than in other regions. In regions with higher accuracy data, a higher weight/priority may be applied in the verification process. Higher priority/weight can be used to determine the accuracy of the parcel attributes and what, if any, adjustments and/or additions should be made to the parcel attributes. In some embodiments, a weighted matching algorithm may be applied to the parcel attributes to determine when the parcel data has been verified. For example, the parcel attributes may be compared with the mapping and addressing data, and a match score based on the weights can be determined. If the match score exceeds a certain threshold, then the parcel data may be considered verified.

The parcel linking module 120 can be configured to link or de-link parcels in a neighborhood of a given parcel. For example, the parcel linking module 120 can implement embodiments of a link process that is further described below. In some embodiments, the link process starts with an input parcel community, which is a group of a plurality of parcels separated by no more than a threshold distance. At least some of the parcels in the community have spatially contiguous property boundaries. The community may be bounded by streets adjacent to the community. Because parcels share boundaries with direct neighbors but typically do not extend across streets, a community may be thought of as analogous to, for example, a city block. The community may be bounded by streets. The link process can generate a number of intermediate actions, including enlarged parcel boundaries and their polygon union, a reduced boundary, parcel and reduced boundary intersection segments, and data structures maintaining links between parcels. A result of the link process is that a given parcel is linked to a reduced set of neighbor parcels. The parcels in the reduced set can be matched to the proper street address for each individual parcel. For example, addresses of the neighbor parcels tend to bracket the given parcel in a street number sense (e.g., a parcel with a lower address number and a parcel with a higher address number than the address of the given parcel).

The reporting module 125 can provide or output information about the parcels to a system administrator or customer (e.g., a real estate agent or an insurance company). For example, the reporting module 125 may provide information via electronic mail, via a web-based interface (e.g., using suitable application programming interface (API) commands), over the network 135, etc. The reporting module 225 may store the parcel information acquired, updated, or generated by the services 105 in a data store (e.g., the data store 130 shown in FIG. 1 or some other data store) where the parcel information can be accessed by appropriate parties. Although the geocoding engine 100 of FIG. 1 is shown as comprising several separate modules for providing the parcel services 105, this is for purposes of illustration and is not intended to limit the scope of the geocoding engine. In other implementations, some or all of the functionality of the illustrated modules may be combined, rearranged, or left out.

One or more computing devices 140 can obtain the services 105 from the geocoding engine 100 over a network 135. For example, an administrator or manager can use a computing device 140 to manage the system, or a customer, such as a real estate broker, insurance provider, government agency, etc., can use a computing device to request or access one or more of the real estate services. The computing devices 140 can include general purpose computers, servers, data input devices (e.g., terminals or displays), web interfaces, portable or mobile computers, laptops, or tablets, smart phones, etc. The network 135 can provide wired or wireless communication between the computing devices 140 and the services 105 provided by the engine 100. In some implementations, the real estate parcel data store 130 can communicate with the services 105 (and/or the computing devices 140) over the network 135. The network 135 can be configured as a local area network (LAN), a wide area network (WAN), the Internet, an intranet, combinations of the same, or the like. In certain embodiments, the network 135 can be configured to support secure shell (SSH) tunneling or other secure protocol connections for the transfer of data between the geocoding engine 100, the computing devices 140, and/or the data store 130.

The geocoding engine 100 and the real estate parcel services 105 can be implemented on computer hardware, such as one or more physical computer servers programmed with specific computer-executable instructions. The data store 130 can be implemented on any type of computer storage medium (e.g., non-transitory data storage). Although illustratively shown as a single data store in FIG. 1, the real estate parcel data can be stored on any number of data stores.

The geocoding engine 100 may access machine-readable versions of the real estate parcel data (e.g., information stored on the data store 130). For example, the machine-readable version can include an extensible markup language (XML) version of the data fields in a data record. The fields can include numerical, Boolean, or alpha-numeric values. The geocoding engine may use such data, or information based on an analysis of such data that is obtained from public or proprietary data sources (e.g., from CoreLogic, Inc., Irvine, Calif.).

Example Process for Linking Real Estate Parcels

As discussed above, the parcel linking module 120 of the geocoding engine 100 can perform a process to link (or de-link) parcels. For example, the link process can maintain potential links between potential address neighbors, while dismissing or removing links between the remaining spatial neighbor parcels. The link process can be used to link a particular parcel to 'address neighbors' with the next lower and next higher address number in a spatial sense.

Figure 2A:
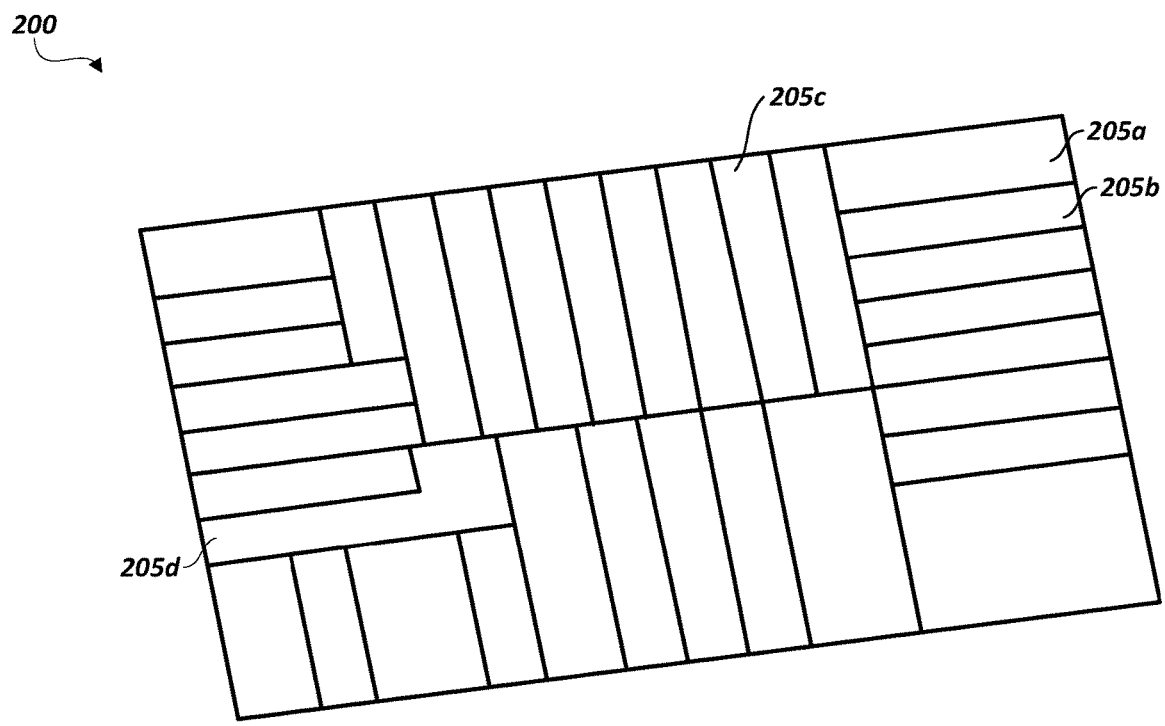
FIG. 2A schematically illustrates an example of a community of parcels.

In some embodiments, the link process starts with input parcel "communities," which are groups of spatially contiguous parcel boundaries separated by no more than a threshold distance. Because parcels share boundaries with direct neighbors but typically do not extend across streets, a community is analogous to a city block. FIG. 2A schematically illustrates an example of a community 200 of parcels, such as parcels 205a, 205b, 205c, 205d, and 205e. Each parcel has a boundary that defines the metes and bounds of the parcel. The threshold distance used to define a particular community can depend on, for example, a distance between parcels, widths of streets separating parcels, distances between streets the bound the community of parcels, etc. For example, the threshold distance can be a fraction (e.g., ½, ⅓, or ¼) of a street width, because, as noted, parcels share boundaries with direct neighbors but typically do not extend across streets.

The link process can generate a number of intermediate actions, including enlarged parcel boundaries and their polygon union, a reduced boundary, parcel and reduced boundary intersection segments, and data structures maintaining links between parcels. A result of the link process is that a given parcel is linked to a reduced set of neighbor parcels. The parcels in the reduced set can be matched to the proper street address for each individual parcel. For example, addresses of the neighbor parcels tend to bracket the given parcel in a street number sense (e.g., a parcel with a lower address number and a parcel with a higher address number than the address of the given parcel).

Figure 2B:
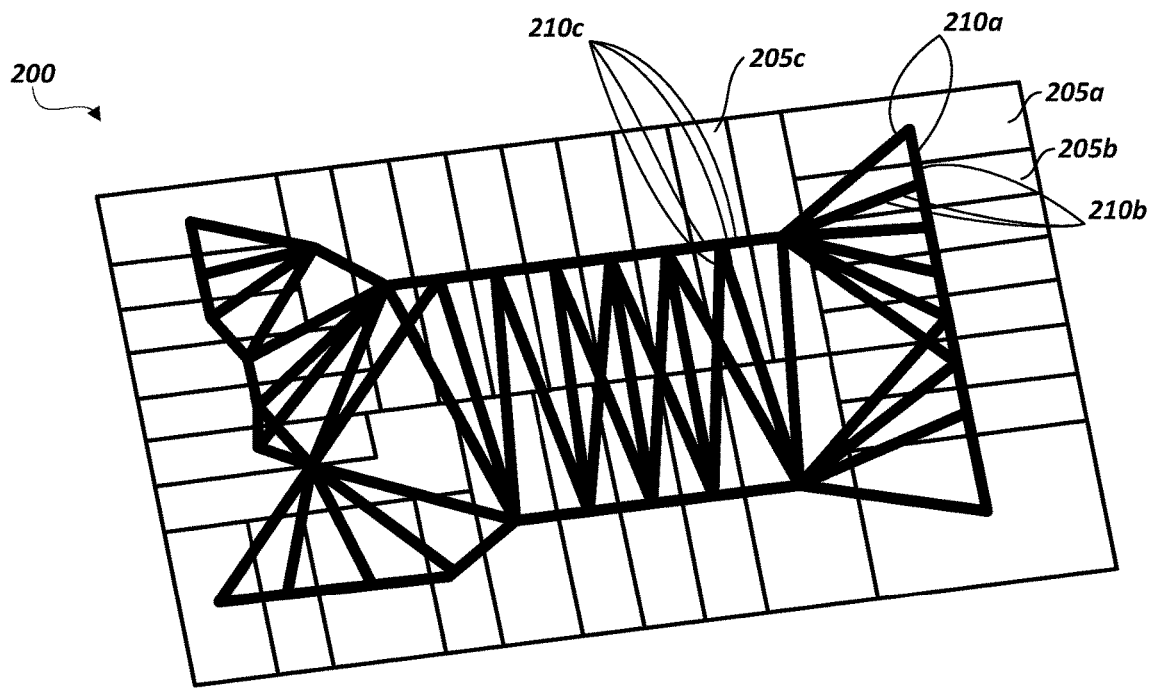
FIG. 2B schematically illustrates links (in bold lines) for the parcels in the community.

An example of the parcel link process will now be described. The process can operate on a per community basis and will be described with reference to the example community 200 of parcels schematically illustrated in FIG. 2A. The link process determines spatial neighboring parcels for each parcel in the community. The process also determines links between centroids of these spatial neighbors. FIG. 2B schematically illustrates links (in bold lines) for the parcels in the community 200. For example, the parcel 205a has links 210a to its two neighboring parcels, the parcel 205b has links 210b to its three neighboring parcels, and the parcel 205c has links 210c to its four neighboring parcels. Some parcels can have many spatial neighbors. For example, the parcel 205d has nine neighboring parcels.

The parcel link process can determine a community border for the community of parcels. The community border can be obtained from the union of each parcel boundary in the community, for example, by determining the outward facing borders of the community. Typically, the union of the parcel boundaries includes a border that faces one or more streets, and the community border can reflect the location of these street(s). In some implementations, the parcel link process calculates a path (e.g., a perimeter) that surrounds the community of parcels. The link process may reduce (or shrink) the path so that the path intersects at least a portion of the parcels in the community and the reduced (or shrunken) path may represent the community border.

Figure 3A:
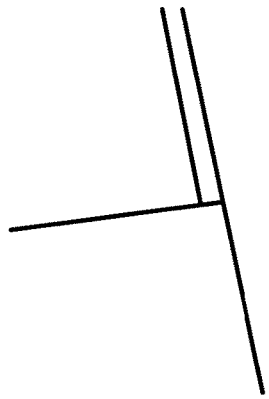
FIGS. 3A and 3B schematically illustrate example appearances of a parcel boundary at two different resolutions for a lower right corner of a parcel in the example community illustrated in FIGS. 2A and 2B.
Figure 3B:
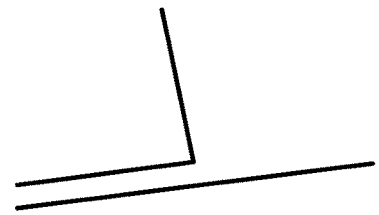

Parcel boundary data can include errors or inaccuracies of varying degrees. FIGS. 3A and 3B schematically illustrate example appearances of a parcel boundary at two different resolutions for the lower right corner of the parcel 205e in the community 200. In FIG. 3A, the parcel 205e appears to be connected to spatial neighbors, however, at a higher resolution shown in FIG. 3B, the parcel 205e is unconnected to its spatial neighbors. Thus, a parcel that appears connected to spatial neighbors may not be connected at all, and the union of the parcel boundaries may have disconnected pieces or wedge shaped interior spikes.

Figure 4A:
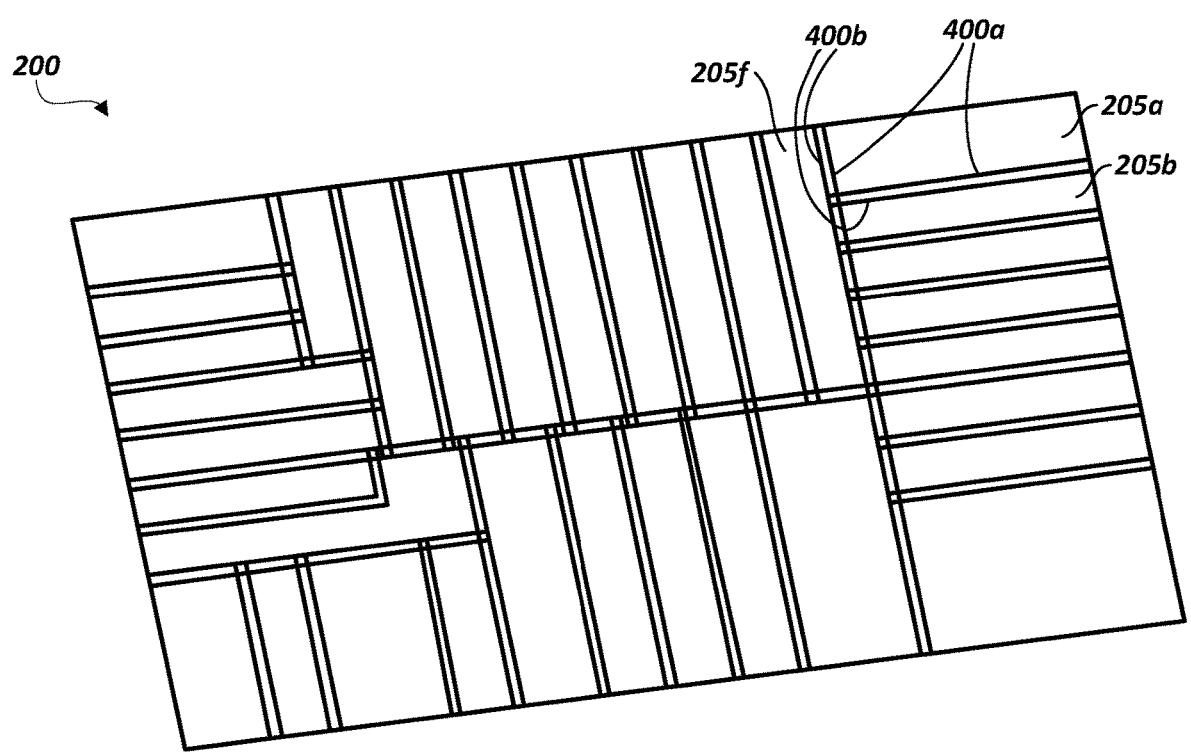
FIG. 4A schematically illustrates an example of enlargement of the parcel boundaries for the example community of parcels illustrated in FIGS. 2A and 2B.

Because certain embodiments of the link process seek to determine the outward, street facing borders for the community border, the link process may, in some implementations, enlarge the parcels to create overlap among neighboring parcels in the community (enlargement may sometimes be referred to as dilation). FIG. 4A schematically illustrates an example of the enlargement of the parcel boundaries for the community 200 of parcels. For each parcel, the original boundary and the enlarged boundary are illustrated in FIG. 4A. For example, for parcel 205a, the original boundary 400a has been enlarged to boundary 400b so as to overlap neighbor parcels 205b and 205f. As can be seen from FIG. 4A, the enlargement causes each parcel boundary to move outward from the centroid of the parcel to create overlap with neighboring parcels. The amount of enlargement can depend on, for example, a typical distance between centroids of adjacent parcels and may be a fraction (e.g., 1%, 5%, 10%, etc.) of that distance.

Figure 4B:
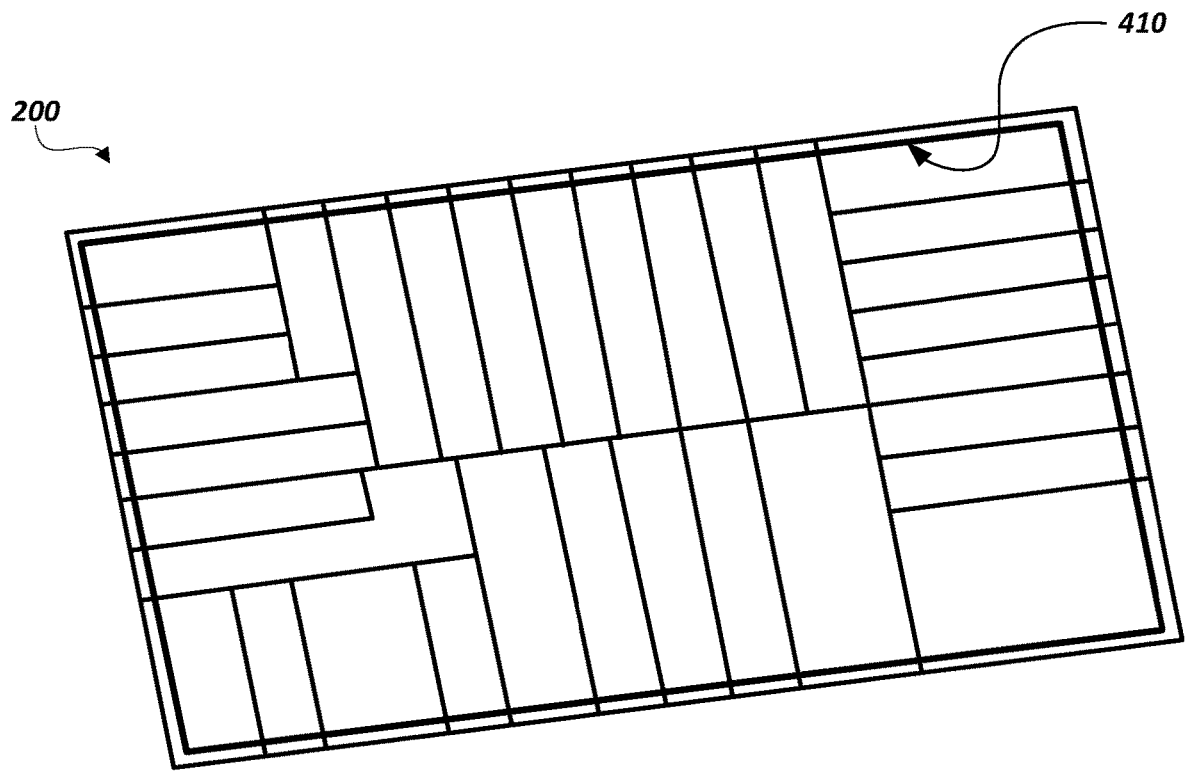
FIG. 4B schematically illustrates an example of the community border for the example community of parcels illustrated in FIGS. 2A and 2B.

After enlargement, the link process may apply a union operation to the parcels in the community (e.g., to find the outward street facing boundary of the community) and a reduction operation (sometimes referred to as an erosion operation) to reduce the enlargement which results in the generation of the community border (e.g., the outward street facing border). The reduction of the parcel boundaries can be by a reduction amount than the enlargement amount, for example, by a factor of twice the enlargement amount. The community border slightly intersects the parcels in the community. FIG. 4B schematically illustrates in bold an example of the community border 410 for the community 200. The community border can be a polygon, e.g., the example community border 410 illustrated in FIG. 4B is a four-sided polygon (e.g., a rectangle in this example).

The link process can then determine a group of parcels in the community such that each of the parcels in the group intersects the community border. In the example community 200 shown in FIG. 4B, all of the parcels in the community intersect the community border 410 so that the group contains all of the community parcels. In other communities, only a subset of the parcels will intersect the community border, with the remaining parcels located interior to (and not intersecting) the community border. In such cases, the group of parcels contains fewer than all the parcels in the community.

Figure 4C:
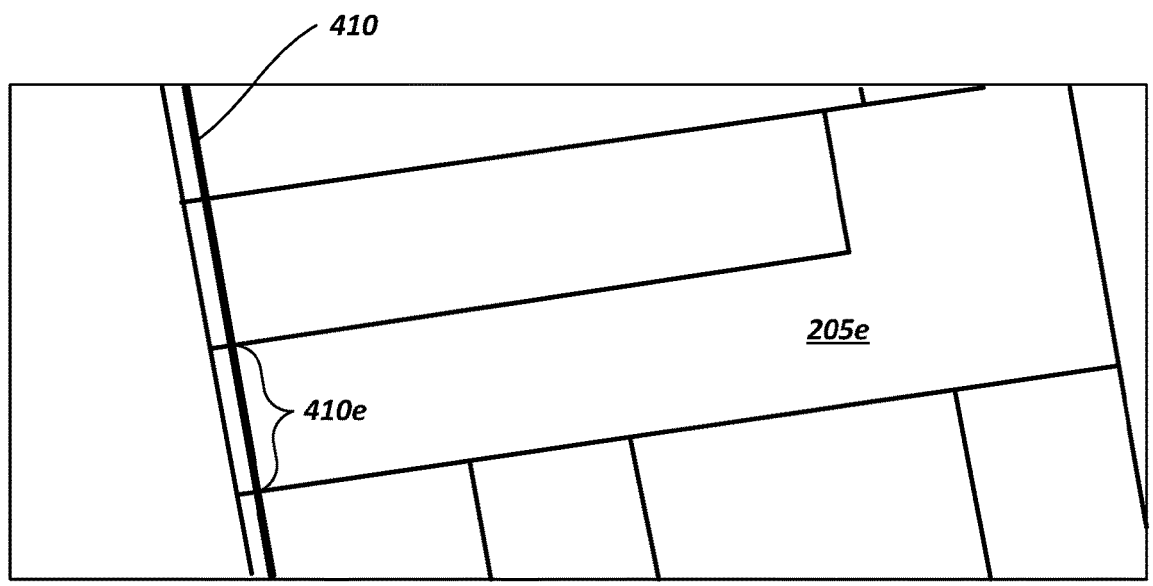
FIG. 4C schematically illustrates an example of a border intersection of a parcel with the community border.

For each parcel intersecting the community border, the link process determines a border intersection between the parcel and the community border. The border intersection for a particular parcel is typically a shorter portion of the community border representing the street-facing region (or regions) of the parcel. FIG. 4C schematically illustrates an example of the border intersection 410e of the parcel 205e with the community border 410. Although the parcel 205e intersects the community border 410 at one location, more complicated shaped parcels may intersect the community border in multiple locations.

Using the border intersection(s), the link process may perform a spatial operation to filter neighbors of each parcel to generate a reduced set of neighbor parcels that includes only those parcels within a threshold distance from that parcel's border intersection. The threshold distance can depend on a typical distance between parcels in the community, an overall size of the community, etc. For each parcel, the link process can order the neighbor parcels in the reduced set based on distance from the parcel's border intersection and thereby identify the neighbor parcels that likely bracket the parcel in an address number sense (e.g., the next lower address number and the next higher address number). For example, such bracketing neighbor parcel(s) can be identified as the parcel(s) in the reduced set with the smallest distance(s) from the border intersection of the parcel. The bracketing neighbor parcels may include two parcels in the reduced set having the least distance and the next-to-least distance, respectively, from the border intersection, because these two parcels are likely to be the two closest neighbors of the parcel (both in a spatial sense and in an address number sense). In some implementations, directionality of the links to parcels in the reduced set can be used to identify the bracketing neighbors of a given parcel. For example, one bracketing neighbor may be on a first side of the given parcel, and a second bracketing neighbor may be on a second side of the given parcel, with the second side different from the first side (e.g., opposite to the first side). For example, if a first neighbor parcel is on a "right side" or a "north side" of the given parcel, the second neighbor may be on the "left side" or the "south side", respectively, of the given parcel.

Figure 5:
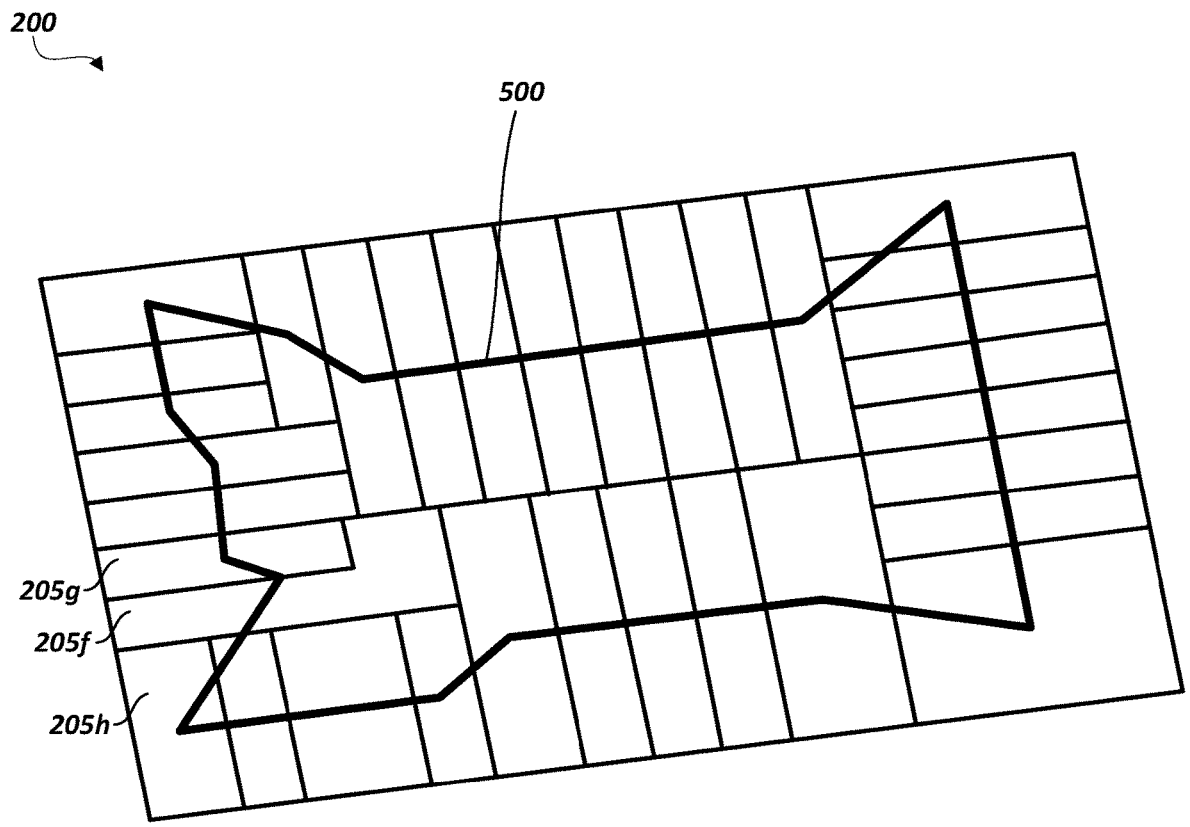
FIG. 5 schematically illustrates an example of links (in bold) between centroids of address neighbor parcels in the example community illustrated in FIGS. 2A and 2B. Note the number of links between neighbor parcels has been reduced compared to the number of links illustrated in the example in FIG. 2B.

The link process thereby generates a reduced set of neighbor parcels that are linked to each parcel. FIG. 5 schematically illustrates an example of connections 500 between centroids of the reduced (filtered) set of neighbor parcels for the example community 200. As can be seen from the example shown in FIG. 5, each of the parcels is linked to a reduced set of neighbors (in this illustrative example, two neighbors for each parcel). In effect, a parcel is de-linked from other parcels in the community that are not in the reduced set, which advantageously may permit finding the bracketing address neighbors.

For example, for the parcel 205e, its two neighbors 205g, 205h are those facing the street to which the parcel 205e is most likely addressed. The addresses of the two neighbors 205g, 205h thereby tend to bracket the address of the parcel 205e in an address number sense. For example, one of the parcels 205g, 205h likely has a higher address number than the address number for the parcel 205e, and the other one of the parcels 205g, 205h likely has a lower address number than the address number for the parcel 205e. Thus the link process has not only reduced the number of potential neighbors for the parcel 205e from nine (shown in FIG. 2B) to two (shown in FIG. 5) but has also identified the two parcels 205g and 205h that likely bracket the address of the parcel 205e. After the link process is performed, and each parcel is linked to its address neighbors, the geocoding engine 100 can more readily match or verify the proper address to each parcel.

Figure 6:
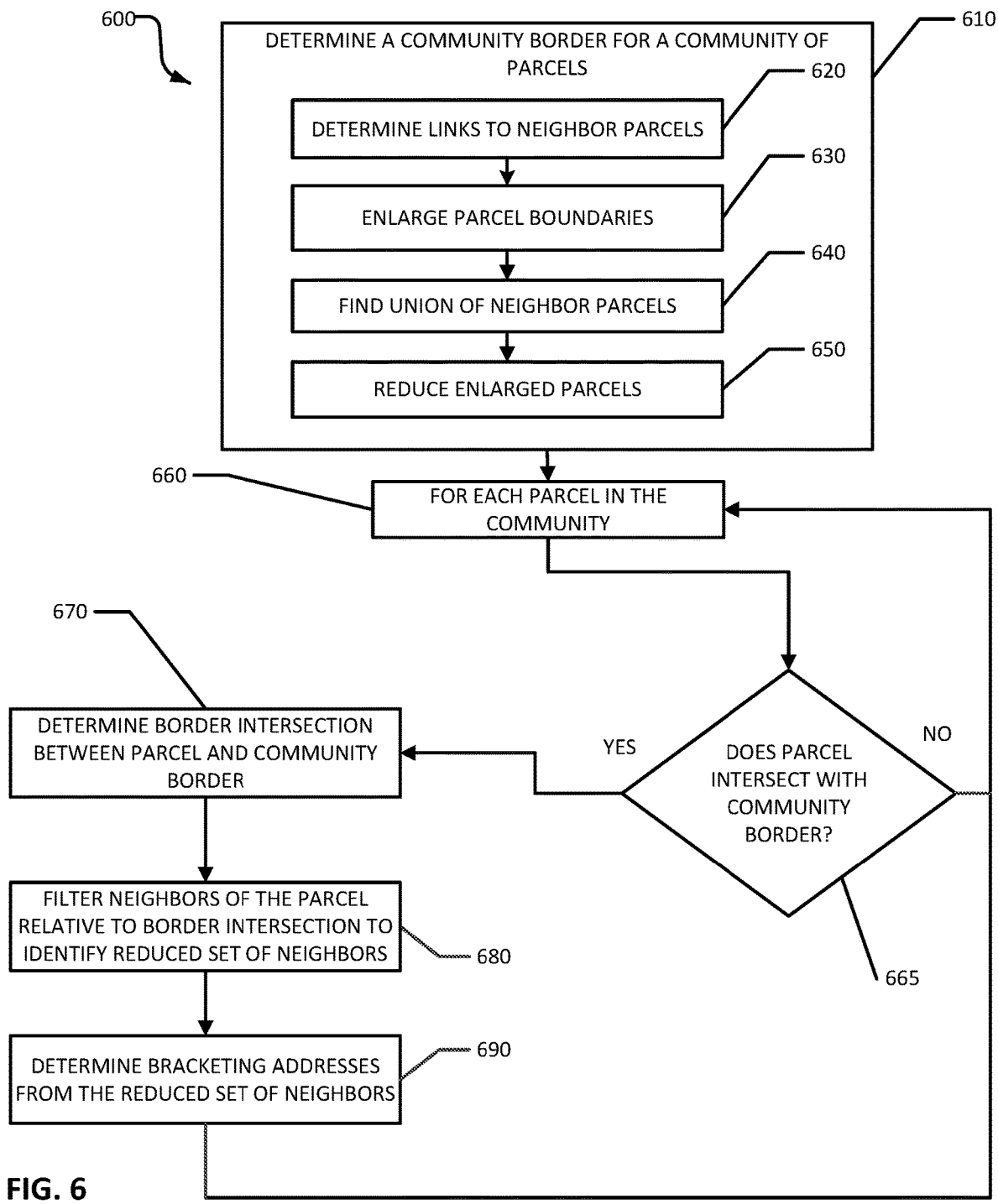
FIG. 6 is a flowchart that schematically illustrates an example of a link process for linking real estate parcels.

FIG. 6 is a flowchart that schematically illustrates an example of a link process 600 for linking real estate parcels. The link process 600 can be performed by the parcel linking module 120 of the geocoding engine 100. The link process 600 can include some or all of the actions described with reference to the example community 200 illustrated in FIGS. 2A-5. At block 610, the link process determines a community border for a community of real estate parcels. At block 620, for each of the parcels in the community, the link process may determine links to neighbor parcels (see, e.g., FIG. 2B). To avoid difficulties associated with errors or inaccuracies in the parcel boundary data, at block 630 the link process may enlarge the parcels to create overlap among the parcels (see, e.g., FIG. 4A). At block 640, the link process can determine the union of the enlarged parcels, and at block 650, the link process can reduce the enlarged parcels (e.g., by an amount equal to twice the enlargement as discussed with reference to FIGS. 4A and 4B). The link process can thereby determine the community border, which slightly intersects the parcels in the community. The community border may be the outward facing border toward the street(s) surrounding the community.

Starting at block 660, the link process works through the parcels in the community to identify a reduces set of parcels that neighbor each parcel (e.g., the address neighbor parcels). At block 670, the link process determines a border intersection between the parcel and the community border. At block 680, the link process filters the neighbors of the parcel to identify a reduced set of neighbors. For example, the filter can be a spatial filter that includes in the reduced set only those parcels within a threshold distance from the parcel's border intersection. The threshold distance can depend on a typical distance between parcels in the community, an overall size of the community, etc. At block 690, the link process can order the neighbor parcels in the reduced set based on distance from the parcel's border intersection and thereby identify the neighbor parcels that likely bracket the parcel in an address number sense (e.g., the next lower address number and the next higher address number relative to the parcel's address number). For example, such bracketing neighbor parcels can be identified as the parcels in the reduced set with the smallest distances from the border intersection of the parcel. The link process 600 can link the parcel to at least one neighbor parcel in the reduced set. In many cases, the parcel can be linked to two parcels in the reduced set, which have address numbers that bracket the address number of the parcel. The link process can then return to block 660 to process the next parcel in the community. When all parcels in the community have been analyzed, the link process terminates.

Use of the link process by the parcel linking module 120 can provide one or more advantages in various implementations of the geocoding engine 100. For example, by linking parcels with their neighbors in the reduced set, rather than all the neighbors in the community, the parcel information in the parcel database can be more efficiently managed by the geocoding engine 100. Further, by linking a parcel to its neighbors in the reduced set, the geocoding engine 100 can more accurately match a parcel with its address number, which provides a more accurate and reliable parcel database for use by real estate professionals, insurance companies, government agencies, and so forth.

CONCLUSION

Each of the processes, methods, and algorithms described herein and/or depicted in the attached figures may be embodied in, and fully or partially automated by, code modules executed by one or more physical computing systems, hardware computer processors, application-specific circuitry, and/or electronic hardware configured to execute specific and particular computer instructions. For example, computing systems can include general purpose computers (e.g., servers) programmed with specific computer instructions or special purpose computers, special purpose circuitry, and so forth. A code module may be compiled and linked into an executable program, installed in a dynamic link library, or may be written in an interpreted programming language. In some implementations, particular operations and methods may be performed by circuitry that is specific to a given function.

Further, certain implementations of the functionality of the present disclosure are sufficiently mathematically, computationally, or technically complex that application-specific hardware or one or more physical computing devices (utilizing appropriate specialized executable instructions) may be necessary to perform the functionality, for example, due to the volume or complexity of the calculations involved or to provide results substantially in real-time. For example, the real estate parcel database can include hundreds of millions of parcel records, and specifically programmed computer hardware is necessary to process the parcel data (e.g., to link spatially neighboring parcels) in a commercially reasonable amount of time.

Code modules or any type of data may be stored on any type of non-transitory computer-readable medium, such as physical computer storage including hard drives, solid state memory, random access memory (RAM), read only memory (ROM), optical disc, volatile or non-volatile storage, combinations of the same and/or the like. The methods and modules (or data) may also be transmitted as generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). The results of the disclosed processes or process steps may be stored, persistently or otherwise, in any type of non-transitory, tangible computer storage or may be communicated via a computer-readable transmission medium.

Any processes, blocks, states, steps, or functionalities in flow diagrams described herein and/or depicted in the attached figures should be understood as potentially representing code modules, segments, or portions of code which include one or more executable instructions for implementing specific functions (e.g., logical or arithmetical) or steps in the process. The various processes, blocks, states, steps, or functionalities can be combined, rearranged, added to, deleted from, modified, or otherwise changed from the illustrative examples provided herein. In some embodiments, additional or different computing systems or code modules may perform some or all of the functionalities described herein. The methods and processes described herein are also not limited to any particular sequence, and the blocks, steps, or states relating thereto can be performed in other sequences that are appropriate, for example, in serial, in parallel, or in some other manner. Tasks or events may be added to or removed from the disclosed example embodiments. Moreover, the separation of various system components in the implementations described herein is for illustrative purposes and should not be understood as requiring such separation in all implementations. It should be understood that the described program components, methods, and systems can generally be integrated together in a single computer product or packaged into multiple computer products. Many implementation variations are possible.

The processes, methods, and systems may be implemented in a network (or distributed) computing environment. Network environments include enterprise-wide computer networks, intranets, local area networks (LAN), wide area networks (WAN), personal area networks (PAN), cloud computing networks, crowd-sourced computing networks, the Internet, and the World Wide Web. The network may be a wired or a wireless network or any other type of communication network.

The systems and methods of the disclosure each have several innovative aspects, no single one of which is solely responsible or required for the desirable attributes disclosed herein. The various features and processes described above may be used independently of one another, or may be combined in various ways. All possible combinations and subcombinations are intended to fall within the scope of this disclosure. Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination. No single feature or group of features is necessary or indispensable to each and every embodiment.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth.

Also, the term "or" is used in its inclusive sense (and not in its exclusive sense) so that when used, for example, to connect a list of elements, the term "or" means one, some, or all of the elements in the list. In addition, the articles "a," "an," and "the" as used in this application and the appended claims are to be construed to mean "one or more" or "at least one" unless specified otherwise.

As used herein, a phrase referring to "at least one of" a list of items refers to any combination of those items, including single members. As an example, "at least one of: A, B, or C" is intended to cover: A, B, C, A and B, A and C, B and C, and A, B, and C. Conjunctive language such as the phrase "at least one of X, Y and Z," unless specifically stated otherwise, is otherwise understood with the context as used in general to convey that an item, term, etc. may be at least one of X, Y or Z. Thus, such conjunctive language is not generally intended to imply that certain embodiments require at least one of X, at least one of Y and at least one of Z to each be present.

Similarly, while operations may be depicted in the drawings in a particular order, it is to be recognized that such operations need not be performed in the particular order shown or in sequential order, or that all illustrated operations be performed, to achieve desirable results. Further, the drawings may schematically depict one more example processes in the form of a flowchart. However, other operations that are not depicted can be incorporated in the example methods and processes that are schematically illustrated. For example, one or more additional operations can be performed before, after, simultaneously, or between any of the illustrated operations. Additionally, the operations may be rearranged or reordered in other implementations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A method of linking real estate parcels in a database, the method comprising:
    under control of a geocoding engine comprising computer hardware;
    accessing a data repository that is configured to store parcel data for each of a plurality of real estate parcels, the parcel data associated with each real estate parcel comprising a parcel boundary;
    identifying a community of real estate parcels, at least some of the plurality of real estate parcels having spatially contiguous boundaries;
    calculating a community border for the community of real estate parcels, wherein calculating the community border comprises enlarging parcel boundaries of the real estate parcels in the community;
    identifying a first real estate parcel in the community of real estate parcels that intersects the community border;
    determining a border intersection between the first real estate parcel and the community border;
    determining a neighboring real estate parcel in the community of real estate parcels that is within a threshold distance of the border intersection;
    creating a link between the first real estate parcel and the neighboring real estate parcel; and
    validating or correcting address information included in a data record for the first real estate parcel based at least in part on the link and an address number of the neighboring real estate parcel.

2. The method of claim 1, wherein each real estate parcel in the community of real estate parcels is represented by a polygon.

3. The method of claim 1, further comprising determining a second neighboring real estate parcel in the community of real estate parcels that is within the threshold distance of the border intersection.

4. The method of claim 3, further comprising linking the first real estate parcel to the second neighboring real estate parcel.

5. The method of claim 4, wherein linking the first real estate parcel to the neighboring and second neighboring real estate parcels further comprises ordering the neighboring real estate parcel and the second neighboring real estate parcel based on a distance of the neighboring real estate parcel from the border intersection and a distance of the second neighboring real estate parcel from the border intersection.

6. The method of claim 5, wherein the neighboring real estate parcel is located the least distance from the border intersection.

7. The method of claim 6, wherein the second neighboring real estate parcel is located the next-to-least distance from the border intersection.

8. The method of claim 7, wherein validating or correcting the address information comprises:
    determining the address number of the neighboring real estate parcel;
    determining an address number of the second neighboring real estate parcel; and
    matching the first real estate parcel to an address number that is bracketed by the address number of the neighboring real estate parcel and the address number of the second neighboring real estate parcel.

9. The method of claim 1, wherein the link represents a determination that the first real estate parcel and the neighboring real estate parcel are neighboring in an address number sense, and wherein validating or correcting the address information comprises using an address number of the neighboring real estate parcel to assign an address number to the first real estate parcel.

10. The method of claim 1, wherein calculating the community border further comprises applying a union operation to the enlarged parcel boundaries to identify an outward facing street boundary of the community.

11. The method of claim 1, wherein validating or correcting the address information comprises adding a missing address number to a data record corresponding to the first real estate parcel.

12. A system for linking in a database, the system comprising:
    non-transitory data storage configured to store parcel data for each of a plurality of parcels, the parcel data associated with each parcel comprising a parcel boundary; and
    a computer system comprising computer hardware, the computer system in communication with the non-transitory data storage, the computer system programmed with executable instructions to at least:

identify a community of parcels, at least some of the plurality of parcels having spatially contiguous boundaries;

calculate a community border for the community of parcels, wherein calculating the community border comprises enlarging parcel boundaries of real estate parcels in the community;

identify a first parcel in the community of parcels that intersects the community border;

determine a border intersection between the first parcel and the community border;

determine a neighboring parcel that is within a threshold distance of the border intersection;

create a link between the first parcel and the neighboring parcel; and validate or correct address information included in a data record for the first real estate parcel based at least in part on the link and an address number of the neighboring parcel.

13. The system of claim 12, wherein each parcel in the community of parcels is represented by a polygon.

14. The system of claim 12, wherein the computer system is further programmed with executable instructions determine a second neighboring parcel in the community of parcels that is within the threshold distance of the border intersection.

15. The system of claim 14, wherein the computer system is further programmed with executable instructions to link the first parcel to the second neighboring parcel.

16. The system of claim 15, wherein the computer system is further programmed with executable instructions to order the neighboring parcel and the second neighboring parcel based on a distance of the neighboring parcel from the border intersection and a distance of the second neighboring parcel from the border intersection.

17. The system of claim 16, wherein the neighboring parcel is located the least distance from the border intersection.

18. The system of claim 17, wherein the second neighboring parcel is located the next-to-least distance from the border intersection.

19. The system of claim 18, wherein the computer system is further programmed with executable instructions to:
determine the address number of the neighboring parcel;
determine an address number of the second neighboring parcel; and
match the first parcel to an address number that is bracketed by the address number of the neighboring parcel and the address number of the second neighboring parcel.

20. The system of claim 12, wherein the link represents a determination that the first real estate parcel and the neighboring real estate parcel are neighboring in an address number sense, and wherein the computer system is programmed to use an address number of the neighboring real estate parcel to assign an address number to the first real estate parcel.

21. The system of claim 12, wherein the computer system is programmed to apply a union operation to the enlarged parcel boundaries to identify an outward facing street boundary of the community.

22. The system of claim 12, wherein the computer system is programmed to add a missing address number to a data record corresponding to the first real estate parcel.

23. Non-transitory computer storage comprising computer-executable instructions that, when executed by a computer, cause the computer to:
identify a community of parcels, at least some of the plurality of parcels having spatially contiguous boundaries;
calculate a border intersection between a first parcel in the community of parcels and a community border associated with the community of parcels, wherein calculating the community border comprises enlarging parcel boundaries of real estate parcels in the community;
determine a neighboring parcel in the community of parcels that is within a threshold distance of the border intersection;
create a link between the first parcel and the neighboring parcel; and
validate or correct address information included in a data record for the first real estate parcel based at least in part on the link and an address number of the neighboring parcel.

24. The non-transitory computer storage of claim 23, wherein the computer-executable instructions further cause the computer to determine a second neighboring parcel in the community of parcels that is within the threshold distance of the border intersection.

25. The non-transitory computer storage of claim 24, wherein the computer-executable instructions further cause the computer to order the neighboring parcel and the second neighboring parcel based on a distance of the neighboring parcel from the border intersection and a distance of the second neighboring parcel from the border intersection.

26. The non-transitory computer storage of claim 25, wherein the computer-executable instructions further cause the computer to:
determine the address number of the neighboring parcel;
determine an address number of the second neighboring parcel; and
match the first parcel to an address number that is bracketed by the address number of the neighboring parcel and the address number of the second neighboring parcel.

27. The non-transitory computer storage of claim 23, wherein the link represents a determination that the first real estate parcel and the neighboring real estate parcel are neighboring in an address number sense, and the computer-executable instructions direct the computer to use an address number of the neighboring real estate parcel to assign an address number to the first real estate parcel.

28. The non-transitory computer storage of claim 23, wherein the computer-executable instructions direct the computer to apply a union operation to the enlarged parcel boundaries to identify an outward facing street boundary of the community.

29. The non-transitory computer storage of claim 23, wherein the computer-executable instructions direct the computer to add a missing address number to a data record corresponding to the first real estate parcel.

* * * * *